(12) United States Patent
Tannenbaum

(10) Patent No.: US 6,317,126 B1
(45) Date of Patent: Nov. 13, 2001

(54) METHOD AND DEVICE FOR ASSOCIATING A PIXEL WITH ONE OF A PLURALITY OF REGIONS IN A LOGARITHM OR COSINE SPACE

(75) Inventor: David C. Tannenbaum, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/265,487

(22) Filed: Mar. 9, 1999

(51) Int. Cl.$^7$ ................................................. G06T 15/50
(52) U.S. Cl. ........................ 345/426; 345/421; 345/427; 345/581; 345/589
(58) Field of Search ................................. 345/420, 421, 345/426, 427, 429, 581, 422, 424, 432, 589

(56) References Cited

U.S. PATENT DOCUMENTS

| | | | |
|---|---|---|---|
| 5,182,797 | 1/1993 | Liang et al. ........................ | 395/160 |
| 5,526,471 | 6/1996 | Tannenbaum et al. .............. | 395/119 |
| 5,659,671 | 8/1997 | Tannenbaum et al. .............. | 395/126 |
| 5,936,633 | * 8/1999 | Aono et al. ........................ | 345/432 |
| 5,990,894 | * 11/1999 | Hu et al. ............................ | 345/418 |

OTHER PUBLICATIONS

Foley et al., "*Computer Graphics Principles and Practice*", $2^{nd}$ Ed. in C, 1997, pp. 721–814.
Woo et al., "*OpenGL Programming Guide*", $2^{nd}$ Ed., Version 1.1, 1997, pp. 169–211.

* cited by examiner

*Primary Examiner*—Mark Zimmerman
*Assistant Examiner*—Kimbinh T. Nguyen
(74) *Attorney, Agent, or Firm*—Baker Botts, L.L.P.

(57) ABSTRACT

A method and device for associating a pixel on a surface with one of a plurality of regions defined on the surface. The regions are concentric and defined on the surface by a cutoff angle $\phi$ and a transition angle $\Delta$. The concentric regions have a center point that is aligned with a source point disposed above the center point. The source point and the center point form a first axis and the source point and the pixel define a second axis between the source point and the pixel. The method and device determine a difference angle ($\phi-\Delta$). The difference angle is then converted into cosine space by determining $\cos(\phi-\Delta)$. Next, the difference angle in the cosine space is converted into a log space. The pixel angle $\theta$ between the first axis and the second axis is evaluated in the log and cosine spaces. The region in which the pixel belongs is determined by comparing the difference angle and the pixel angle in one or both of the log space and the cosine space.

23 Claims, 7 Drawing Sheets

METHOD AND DEVICE FOR ASSOCIATING A PIXEL WITH ONE OF A PLURALITY OF REGIONS IN A LOGARITHM OR COSINE SPACE

CROSS REFERENCE TO RELATED APPLICATIONS

This application is related to U.S. patent application Ser. No. 09/265,507 filed on the same day herewith and entitled "Method and Device for Generating Per-Pixel Values," by inventor David Tannenbaum et al., the disclosure of which is incorporated herein by reference. This application is also related to U.S. patent application Ser. No. 09/265,493 filed on the same day herewith and entitled "Device, Method, and System for Generating Per-pixel Light Values Using Texture Parameters," by inventor David C. Tannenbaum, the disclosure of which is incorporated herein by reference. Both of these related applications are assigned to the assignee of the present application.

BACKGROUND OF THE INVENTION

The present invention relates to the field of computer graphics and, more particularly, to associating a pixel with one of a plurality of regions for evaluating the pixel light values.

Rendering of realistic images is one of the main goals of graphics system designers. Rendering images of real or imaginary objects typically involves generating geometric models (e.g., polygons) of the objects and applying lighting effects to the polygonal surfaces. In computer graphics, surfaces of an object are often modeled by a polygonal mesh, which is a collection of vertices, edges, and/or polygons. A mesh of polygons may be produced from a variety of sources such as an application, tesselated NURBS surfaces, spheres, cones, etc. The vertices may be connected by edges and a sequence of edges or vertices may define one or more polygons.

Rendering of realistic 3D graphics requires accurate and efficient modeling of 3D surfaces based upon the position, orientation, and characteristics of the surfaces and the light sources illuminating them. In particular, the interaction between lights and surfaces must be modeled for rendering. To accurately model lighting effects, conventional computer graphics systems have typically implemented a variety of lighting models and shading techniques to generate light values at individual pixels of a graphics primitive such as a polygon. A co-pending U.S. patent application Ser. No. 09/265507 and entitled "Method and Device for Generating Per-Pixel Values," by inventor David Tannenbaum et al., describes several exemplary lighting models and shading techniques.

Conventional lighting models typically model one or more lighting effects such as ambient light, diffuse reflection, specular reflection, and spotlighting, each of which is well known in the art. The ambient light accounts for a lighting effect resulting from multiple reflections of light from the surfaces present in a scene. On the other hand, the diffuse reflection models reflection of light off a dull, matte surface. In this model, the reflected light from the surface falls off uniformly as a function of the angle between N and L, where N is the outward normal vector at a surface point and L is a light vector. The light vector L has a direction from the surface point to a light source. The diffuse light fall-off in the diffuse reflection model is typically modeled by using a dot product term N·L.

Similarly, the specular reflection accounts for reflection of light off a shiny surface. When light from a light source is reflected off a surface, the reflected light is typically modeled as falling off exponentially from the direction of reflection vector R as seen from the direction of view vector V. For example, the fall-off may be modeled by $\cos^s \alpha$, where s is a surface material's specular-reflection coefficient and a is an angle between vectors R and V. In practice, a dot product term $(N \cdot H)^s$ is often used in place of $\cos^s \alpha$ to model specular reflection at a surface point, where N is a normal vector and H is a half-angle vector. Both the diffuse and specular reflection models assume that a light source radiates light uniformly in all directions.

The spotlight model, on the other hand, adds a direction to a positional light source to allow modeling of directional lights. That is, a spotlight is a special type of local or infinite light source that has a direction as well as a position. For example, a positional light source may function as a spotlight by restricting the shape of the light to exist within a cone. The direction of the spotlight is the direction in which the light points. The spotlight thereby simulates a cone of light, which may have a fall-off in intensity based upon distance from the center of the cone of light.

The spotlight and other conventional lighting models are described in *Computer Graphics: Principles and Practice* by James D. Foley et al., Addison-Wesley (1996), ISBN 0-201-84840-6, which is incorporated herein by reference and constitutes a portion of the background against which the present invention was developed. Additionally, the OpenGL™ (versions 1.1 and 1.2) graphics application programming interface, which is commercially available from Silicon Graphics, Inc., the assignee of the present application, describes various lighting models such as spotlight, diffuse light reflection, specular light reflection, and related parameters for implementing such models. The OpenGL™ (versions 1.1 and 1.2) graphics application programming interface also is incorporated herein by reference.

FIG. 1A illustrates a perspective view of a conventional spotlight 100 being radiated from a light source 102 onto a surface 104. In this configuration, the light source 102 radiates the spotlight 100 in a cone shape that is defined by edge 108 of the cone and a center axis 106 of the cone. The angle between the center axis 106 and the edge 108 of the cone defines a cutoff angle φ. The cutoff angle φ defines a boundary 110 of the spotlight 100. That is, the spotlight value is set to zero in an outer region 114 lying outside of the boundary 110. In an inner region 112 of the boundary 110, the spotlight value is computed in accordance with a basic spotlight equation, spotlight=$(S \cdot L)^{exp}$, where S represents a spotlight source direction vector, L represents the vector from a point on the surface to the light source, and exp is a spotlight exponent. The spotlight equation may also include other well-known variables such as attenuation, shadow, etc.

FIG. 1B shows a vector diagram 150 depicting the relationship between the light source direction vector S and spotlight vector L of the spotlight equation at an arbitrary point P on a surface 152. The vector S represents the direction of light from the light source 102. The anti-parallel vector −L, on the other hand, represents the direction from the spotlight to point P. By definition, the vector L has the same magnitude but opposite direction as its anti-parallel vector, −L. The angle between the vectors S and −L is designated as angle θ.

Unfortunately, conventional spotlighting techniques using the spotlight equation often exhibit aliasing effects such as jaggies or stairsteps near the boundary of the cutoff angle (e.g., boundary 110 in FIG. 1A). These aliasing effects are caused by the abrupt transition into the cutoff region where the light values are zero. In other words, the transition from the lighted cone area to the outer region is not smooth because the light contribution from a light source is applied in an all-or-nothing fashion based on the relationship of point P with respect to the lighted cone's projection on the surface 104 or 152.

To reduce the aliasing effects, a conventional method provided a transition region between an inner, lighted region and an outer, dark region. FIG. 1C illustrates a perspective view of a spotlight 170 being radiated from a light source 102 onto a surface 176. The light source 102 radiates the spotlight 170 in a cone shape having an angle $\phi$, which is the angle between the edge 172 of the cone and the center axis 174 of the cone. This method provides three regions: an inner region 178, a transition region 180, and an outer region 182. The inner and transition regions 178 and 180 are defined with respect to an inner boundary 184. The transition and outer regions 180 and 182 are defined with respect to an outer boundary 186 defined by the cutoff angle $\phi$.

In this arrangement, the light values in the inner region 178 are computed in accordance with a spotlight equation while the light values in the outer region are set to zero. The light values in the transition region, on the other hand, are computed to provide a gradual fall-off in intensity. The gradual intensity fall-off in the transition region thereby reduces aliasing effects.

One of the drawbacks in implementing the conventional approaches in a computer system is the complexity and cost. For example, determining in which region a pixel falls requires computing a dot product (S·−L) raised to a spotlight exponent and performing complex comparisons involving cosine and arccosine of angles such as cutoff $\phi$, the angle between S and −L, etc. The computation of the dot product along with the evaluation of cosines and arccosines typically requires expensive and complex computer systems.

Thus, what is needed is a method and device that can efficiently determine in which region a pixel belongs for determining spotlight values without substantial cost and complexity.

SUMMARY OF THE INVENTION

Broadly speaking, the present invention fills these needs by providing a method and device for efficiently determining light regions in one or both of a logarithm space and a cosine space. It should be appreciated that the present invention can be implemented in numerous ways, including as a process, an apparatus, a system, a device, a method, or a computer readable medium.

The present invention provides a method and device for associating a pixel on a surface with one of a plurality of regions defined on the surface. The regions are preferably concentric and defined on the surface by a cutoff angle $\phi$ and a transition angle $\Delta$, both of which are defined hereinafter. The concentric regions have a center point that is aligned with a source point disposed above the center point. The source point and the center point form a first axis and the source point and the pixel define a second axis (e.g., axis of L) between the source point and the pixel. In the method and device, a difference angle ($\phi-\Delta$) is first determined. This difference angle is converted into cosine space by determining $\cos(\phi-\Delta)$. The difference angle in the cosine space is then converted into a log space. Next, a pixel angle $\theta$ between the first axis and the second axis is evaluated in the log and cosine spaces. Finally, the method and device determine in which region the pixel belongs by comparing the difference angle and the pixel angle in one or both of the log space and the cosine space. In one embodiment, the method and device associate the pixel with one of a plurality of regions for determining a spotlight value at the pixel.

By using one or both of the log space and the cosine space, the present invention efficiently determines in which region a pixel belongs for computing a pixel value. For example, conversion into and comparison in log and cosine spaces saves an arccosine step without necessitating a table lookup and interpolation process. In addition, the conversion into simpler arithmetic operations allows more efficient hardware implementation of a computer graphics system. That is, the use of the log space allows the substitution of simple arithmetic operations such as multiplication, addition, and subtraction for the more costly operations of exponentiation, multiplication, and division, respectively.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Figure 1A:
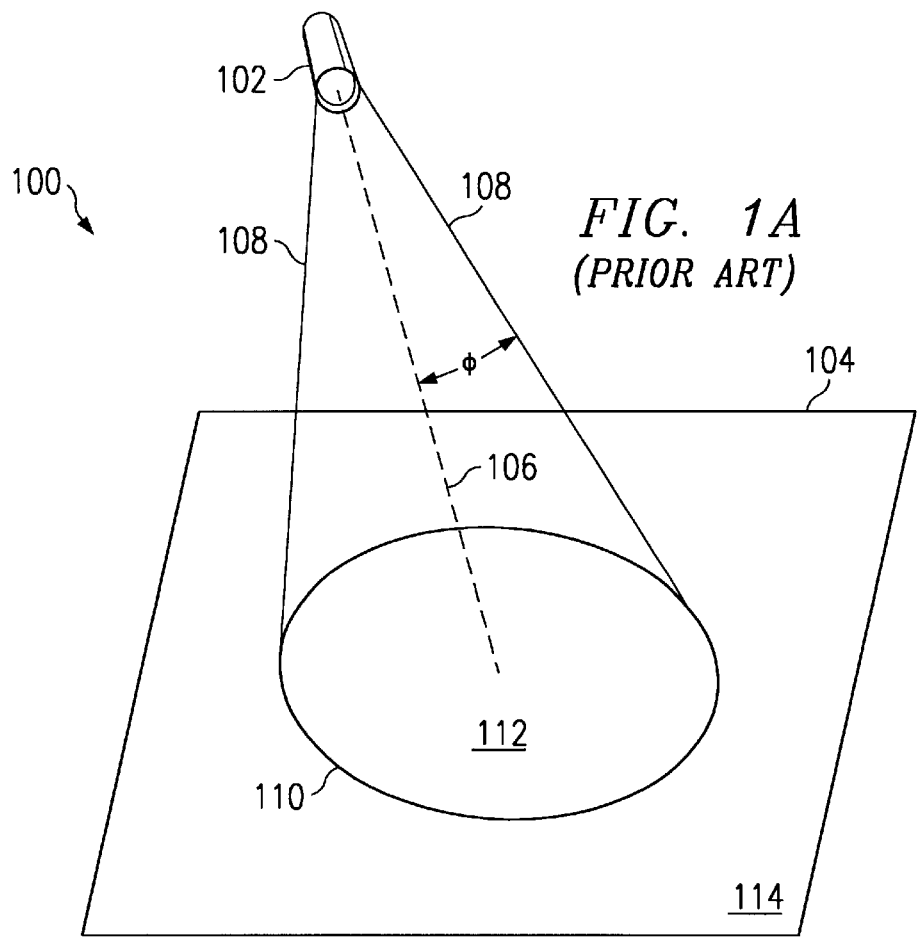
FIG. 1A illustrates a perspective view of a conventional spotlight being radiated from a light source onto a surface.
Figure 1B:
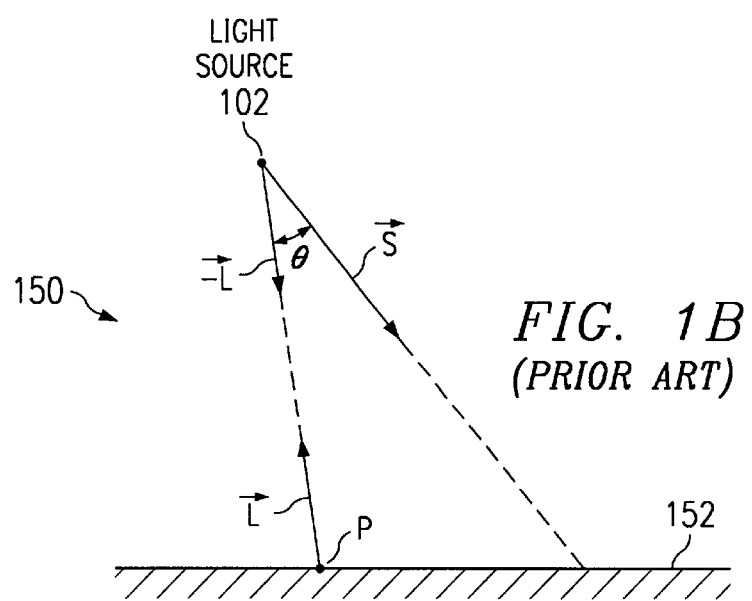
FIG. 1B shows a vector diagram depicting the relationship between the vectors S and L of the spotlight equation at an arbitrary point P on a surface.
Figure 1C:
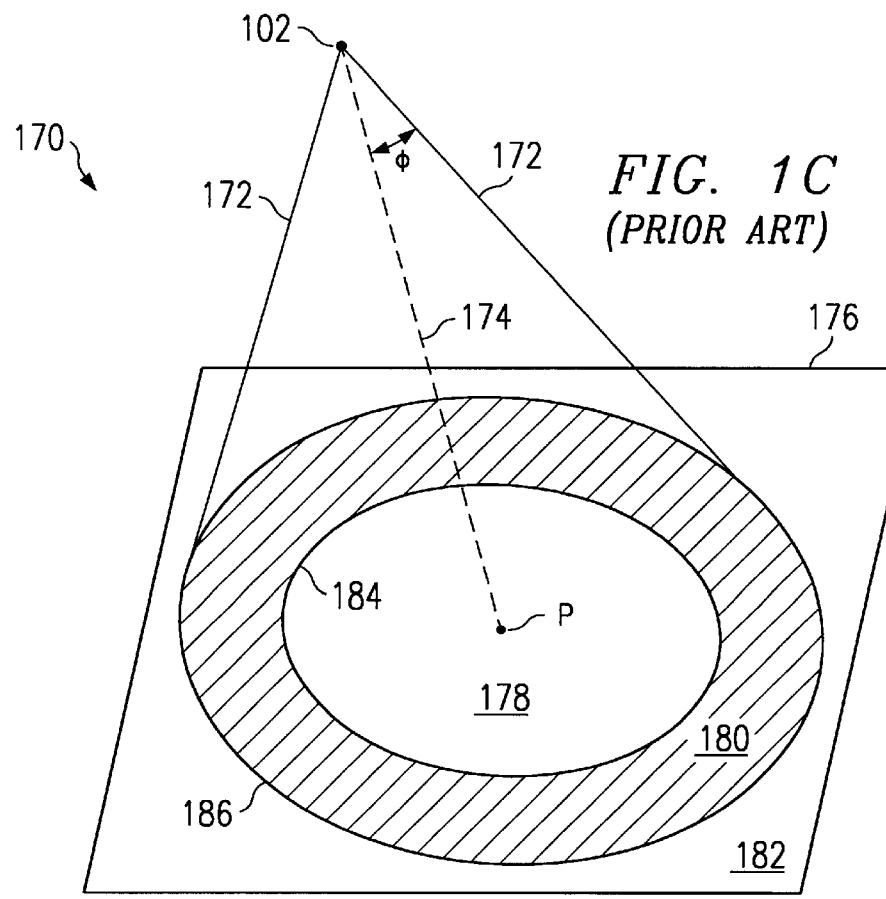
FIG. 1C illustrates a perspective view of a spotlight being radiated from a light source onto a surface.

Reference will now be made to the present preferred embodiments of the invention, examples of which are illustrated in the accompanying drawings. FIGS. 1A, 1B, and 1C are described above in the "Background of the Invention" section.

In the following detailed description of the present invention, which includes a method and device for determining in which region a pixel belongs using a logarithm and/or cosine space, numerous specific details are set forth to provide a thorough understanding of the present invention. It will be obvious to one skilled in the art, however, that the present invention may be practiced without these specific details. In other instances, well-known methods, procedures, components, and circuits have not been described in detail to avoid unnecessarily obscuring certain aspects of the present invention.

Figure 2:
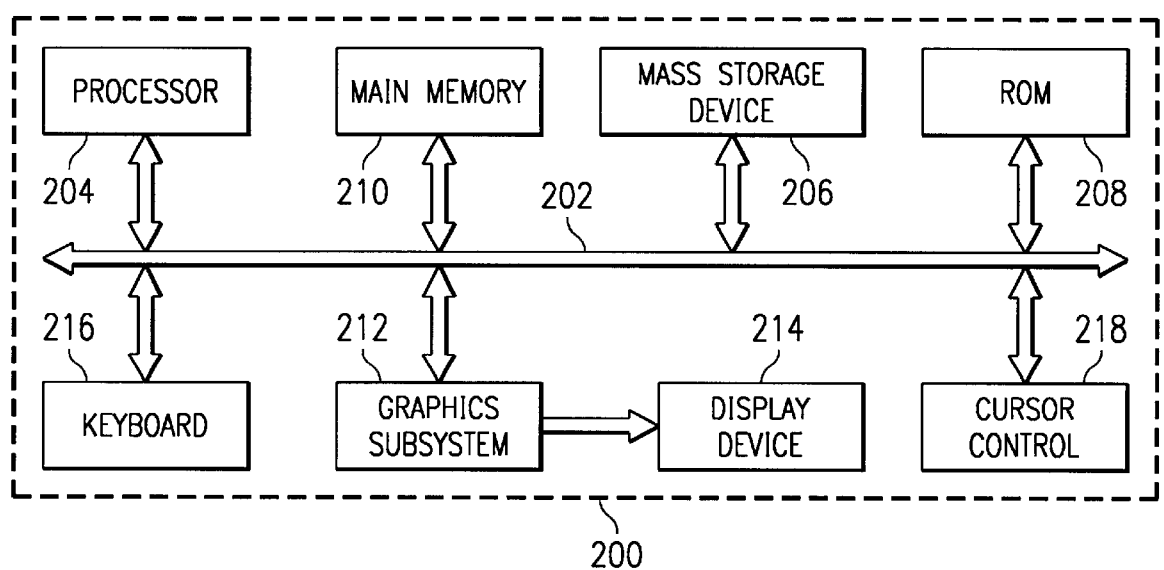
FIG. 2 illustrates a block diagram of a computer graphics system within which the present invention may be implemented or practiced.

FIG. 2 illustrates a block diagram of a computer graphics system 200 within which the present invention may be implemented or practiced. It should be borne in mind that the computer graphics system 200 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer graphics system 200 and are executed by processors therein.

The computer graphics system 200 may be any computer-controlled graphics system suitable for generating complex 2D or 3D images. The computer graphics system 200 includes a bus 202 for transmitting information between the various parts of the computer system. One or more processors 204 for processing information are coupled to the bus 202. The information, together with the instructions for processing the information, are stored in a hierarchical memory system comprised of a mass storage device 206, a read only memory (ROM) 208, and a main memory 210. The mass storage device 206 is used to store a vast amount of data and may include one or more hard disk drives, floppy disk drives, optical disk drives, tape drives, CD-ROM drives, or any number of other types of storage devices having media for storing data. The ROM 208 is used to store data on a permanent basis, such as instructions for the microprocessors. The main memory 210 is used for storing data on an intermediate basis. The main memory 210 may be DRAM, SDRAM, RDRAM, or any other suitable memory for storing data.

A graphics subsystem 212 may be included in the computer graphics system 200. The processor 204 provides the graphics subsystem 212 with graphics data, such as drawing commands and primitives including coordinate vertex data (e.g., pixel color, light vector L, surface normal vector N, view vector V, etc.), and other data related to an object's geometric position, color, texture, shading, and other surface parameters. A display device 214 is coupled to the graphics subsystem 212 to receive image data (e.g., pixel data) for display. Alternatively, the display device 214 may be coupled to the computer graphics system 200 via the bus 202. As used herein, the display device 214 includes any suitable device for display or recording graphics data.

Other devices may also be coupled to the computer graphics system 200. For example, an alphanumeric keyboard 216 may be used for entering commands and other information to processor 204 via the bus 202. Another type of user input device is cursor control device 218 (e.g., mouse, trackball, joystick, and touchpad) used for positioning a movable cursor and selecting objects on a computer screen.

Figure 3:
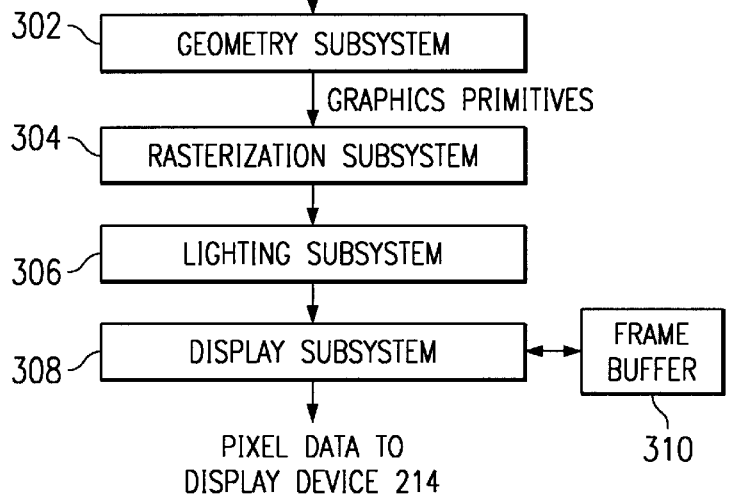
FIG. 3 illustrates a more detailed block diagram of a graphics subsystem in accordance with one embodiment of the present invention.

FIG. 3 illustrates a more detailed block diagram of the graphics subsystem 212 in accordance with one embodiment of the present invention. The graphics subsystem 212 receives drawing commands and primitives from the processor 204 and includes a geometry subsystem 302, a rasterization subsystem 304, a lighting subsystem 306, a display subsystem 308, and a frame buffer 310. In this configuration, the geometry subsystem 302 receives drawing commands and primitives including pixel color, light source direction vector S, spotlight vector L, and other parameters at each vertex and converts the drawing primitives into graphics primitives. The light source direction vector S is constant for a given light source. Additionally, the geometry subsystem 302 may perform transformations, tessellation, clipping, state management, and the like. Preferably, the graphics primitives are in the form of one or more polygons (e.g., triangles) to implement a polygon mesh scheme.

In a preferred embodiment, the polygons are defined by their vertices. Specifically, associated with each vertex are: a color, a Cartesian coordinate (x, y, z), light vector L, and other surface material property values of a lighting model such as the Phong lighting model. Although the graphics primitives are defined herein by their vertices, those skilled in the art will appreciate that the present invention also may be implemented by defining graphics primitives by other well known properties (e.g., NURBS).

The resulting graphics primitives (e.g., points, lines, polygons) are then provided to the rasterization subsystem 304, which is coupled to the geometry subsystem 302. The rasterization subsystem 304 converts the received graphics primitives into pixel data. In addition, the rasterization subsystem 304 rasterizes the graphics primitives to generate a set of L vectors for each of the pixels within the primitives. The vector S is constant for a given light, and thus is not affected during rasterization. At this stage, the rasterization subsystem 304 may also perform Z-buffering, blending, texturing, and antialiasing functions.

The lighting subsystem 306 is coupled to receive the pixel values including the vectors S and L associated with a selected pixel in a primitive and material property values from the rasterization subsystem 304. As will be discussed in more detail below, the lighting subsystem 306 determines in which region each of the pixels belongs and generates light values for the pixel in accordance with one of the embodiments of the present invention. The light values for each of the pixels are then transmitted to the display subsystem 308 and stored in the frame buffer 310. The display subsystem reads the frame buffer 310 and transmits the lighted pixel data values to the display device 214 for display. It should be noted that the frame buffer 310 also may be used by other subsystems (e.g., rasterization subsystem 304) in the graphics subsystem 212 to perform assigned functions.

Figure 4A:
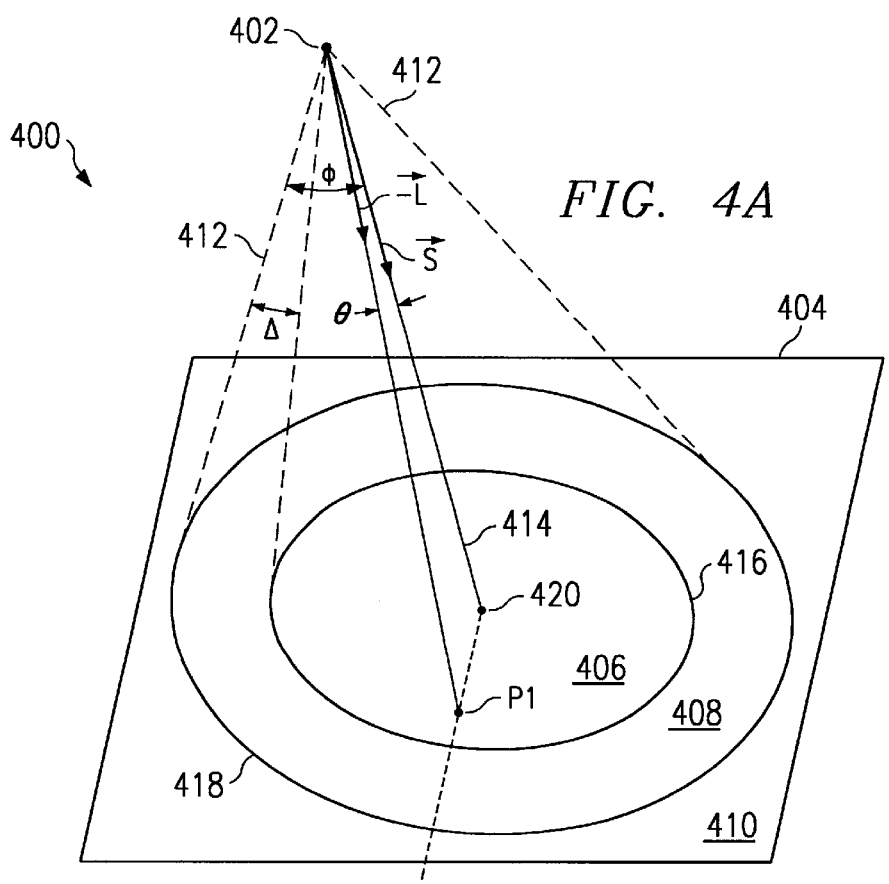
FIG. 4A illustrates a diagram of a spotlight being radiated from a light source onto a surface that includes inner, transition, and outer regions.

The present invention classifies a spotlight area into three regions: an inner region, a transition region, and an outer region. The spotlight value for a point in each region is determined in accordance with an equation associated with the region. FIG. 4A illustrates a diagram of a spotlight 400 being radiated from a light source 402 onto a surface 404 that includes the three, preferably concentric, regions 406, 408, and 410. The light source 402 is arranged to emit the spotlight 400 in a cone shape, which is defined by an angle $\phi$ ("phi") between an edge 412 and center axis 414 of the cone. The light source 402 lies at the apex of the cone. The angle $\phi$ corresponds to the cutoff angle of the spotlight. Hence, the edge 412 may be referred to as the cutoff edge.

The light source vector S corresponds to the center axis 414 of the light cone and passes through the center point 420 on the surface 404. The anti-parallel spotlight vector, −L, has a direction from the light source 402 to a point P1 (e.g., pixel) where the spotlight value is to be determined. Conversely, the spotlight vector L at point P1 points from the point P1 to the light source 402. As used herein, the terms "point" and "pixel" are used interchangeably.

The surface 404 is classified into the inner region 406, the transition region 408, and the outer region 410. The inner and transition regions 406 and 408 are partitioned at an inner boundary 416. An outer boundary 418 separates the transition and outer regions 408 and 410.

A pair of additional angles, θ ("theta") and Δ ("delta"), are defined for use in classifying the regions 406, 408, and 410. The angle θ is defined as the angle between the vectors S and −L. That is, the angle θ represents the angle formed between the selected point P1 and the center point 420 on the surface 404 with respect to the light source 402. By contrast, the angle Δ ("the transition angle") corresponds to an angle formed between the boundaries of inner region 406 and the outer region 410 with respect to the light source 402.

Figure 4B:
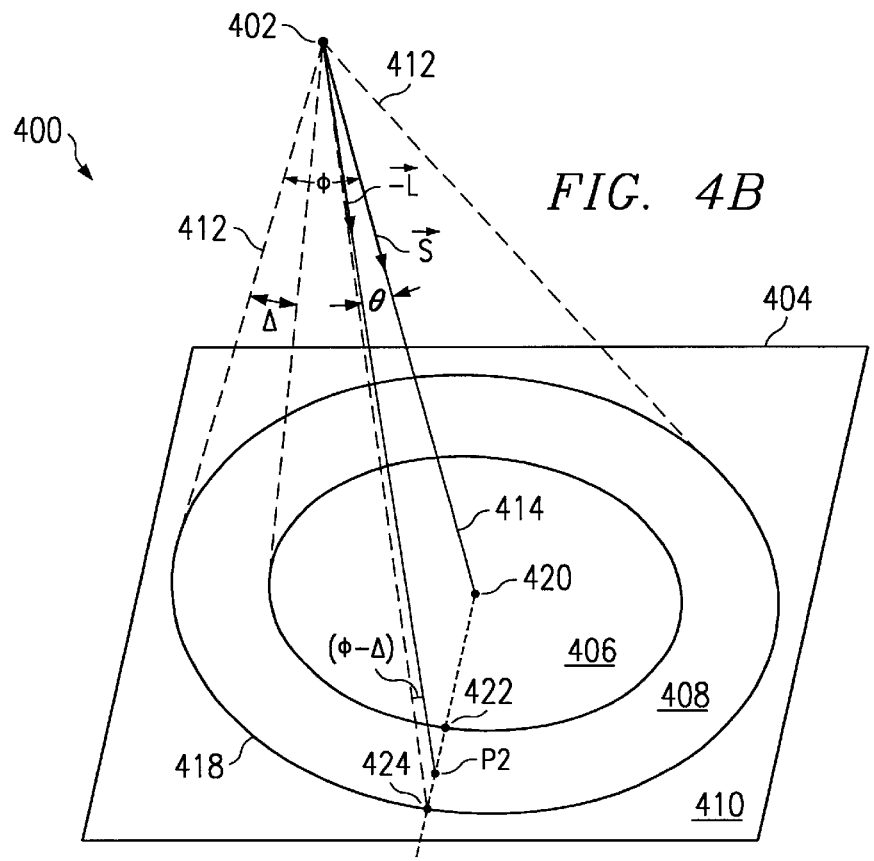
FIG. 4B shows a diagram of the spotlight for determining a spotlight value for a point P2 in the transition region in accordance with one embodiment of the present invention.

FIG. 4B shows a diagram of the spotlight 400 for classifying a point P2 to be in the transition region 408 in accordance with one embodiment of the present invention. The anti-parallel light vector −L points from the light source 402 to the point P2 in the transition region 408. In this arrangement, the spotlight value for the point P2 in the transitional region is determined by interpolating a light value at the point P2 between points 422 and 424. Preferably, the light value at the point P2 is interpolated to provide a smooth transition (i.e., attenuation) between the inner and outer regions 406 and 410 to substantially eliminate aliasing effects. The interpolation may be any suitable interpolation adapted to eliminate aliasing effects such as, for example, linear, cubic, and other higher order interpolations.

Figure 4C:
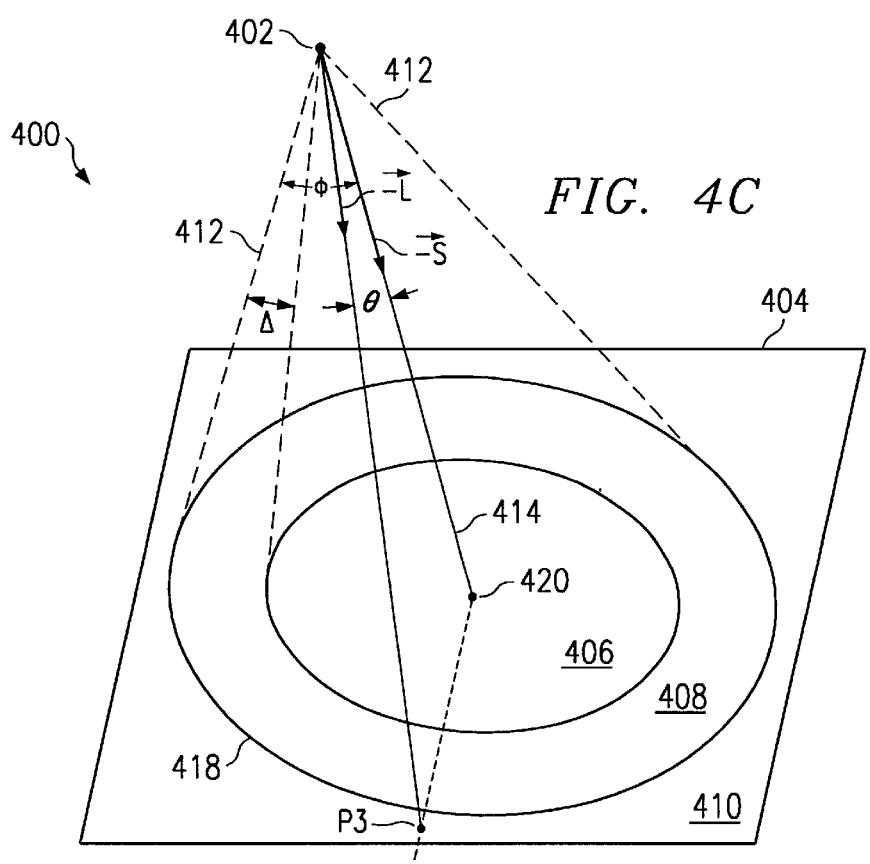
FIG. 4C illustrates a diagram of the spotlight for determining a spotlight value for a point P3 in the outer, cutoff region.

Outer, cutoff region 410 lies beyond the transition region 408. FIG. 4C illustrates a diagram of the spotlight 400 for determining a spotlight value for a point P3 in the outer, cutoff region 410. In the outer region 410, the spotlight value for the point P3 is set to zero. Hence, the light source 402 contributes no light to the outer region 410.

Figure 5:
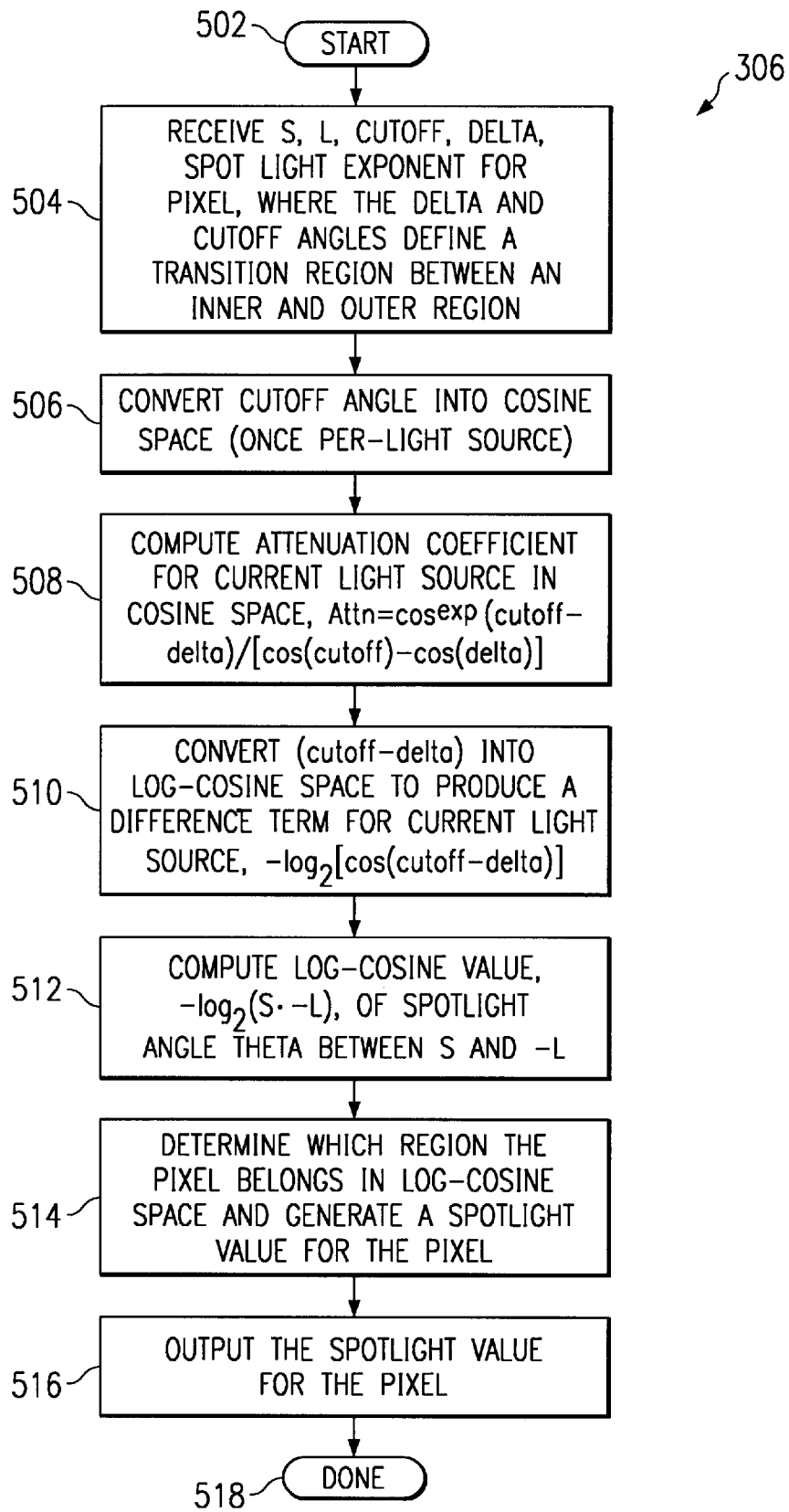
FIG. 5 shows a flowchart of an exemplary method performed by a spotlight unit for determining a light value at a pixel in accordance with one embodiment of the present invention.

FIG. 5 shows a flowchart of an exemplary method performed by the lighting subsystem 306 for determining a spotlight value on a pixel in accordance with one embodiment of the present invention. The method begins in operation 502 and proceeds to operation 504, where the lighting subsystem 306 receives the vectors S and L, a cutoff angle φ, a transition angle Δ, and a spotlight exponent exp for a pixel to be lighted. The cutoff angle φ and the transition angle Δ implicitly define the inner, transition, and outer regions as described in FIGS. 4A, 4B, and 4C.

The next three operations 506, 508, and 510 are performed once per light source. In operation 506, the cutoff angle φ is converted into cosine space by determining cosφ. Next, in operation 508, an attenuation coefficient is computed in cosine space as $\cos^{exp}(\phi-\Delta)/[\cos\phi-\cos(\phi-\Delta)]$.

After conversion into the cosine space, the angle between φ and Δ (i.e., φ−Δ) is converted into log-cosine space in operation 510, to produce a difference term, $-\log_2[\cos(\phi-\Delta)]$. The log-cosine value, $-\log_2(S\cdot-L)$, of spotlight angle θ is then computed in log-cosine space in operation 512. As described below, the conversion into log-cosine space facilitates comparison operations to determine in which region a pixel belongs. For example, the conversion into and comparison in cosine space saves an arccosine step, which would typically require a table lookup and interpolation process.

The spotlight angle θ represents the angle between the vectors S and −L. Once the difference term and the spotlight angle θ have been determined in log-cosine space, the region in which the pixel belongs is determined in operation 514. In addition, a spotlight value for the pixel is evaluated in accordance with the classified region. For example, if the pixel is determined to be in the inner region, then the spotlight value at the pixel is determined in accordance with the spotlight equation, $(S\cdot-L)^{exp}$ through the method described in the co-pending application Ser. No. 09/265507, entitled "Method and Device for Generating Per-Pixel Values," by inventor David Tannenbaum et al.

In contrast, if the pixel is determined to be in the outer region, then the spotlight value for the pixel is set to zero. Still further, if the pixel is determined to be in the transition region, then the spotlight value for the pixel is interpolated between the inner and outer regions. The computed spotlight value for the pixel is then output for subsequent display or recording in operation 516. The method then terminates in operation 518.

Figure 6:
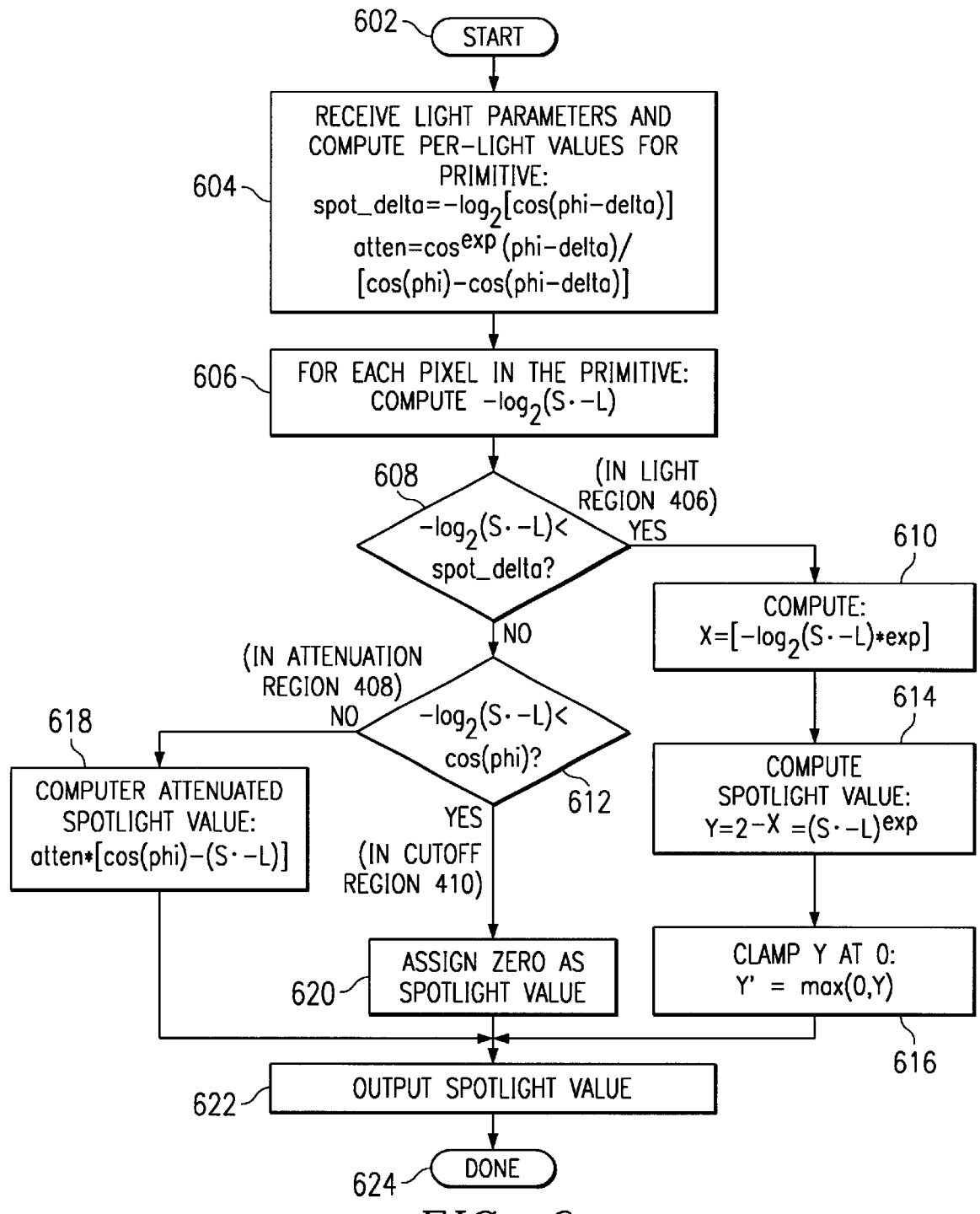
FIG. 6 shows a more detailed flowchart of the method for determining a region and spotlight value of the pixel in accordance with one embodiment of the present invention.

FIG. 6 shows a more detailed flowchart of the method operation 514 for determining a region and spotlight value of the pixel in accordance with one embodiment of the present invention. The method begins in operation 602 and proceeds to operation 604, where light parameters are received and per-light values for the primitive are computed. Specifically, in operation 604, a spot_delta value is determined by computing, in log-cosine space, a difference term, $-\log_2[\cos(\phi-\Delta)]$ while an attenuation value, atten, is evaluated by computing $\cos^{exp}(\phi-\Delta)/[\cos(\phi)-\cos(\phi-\Delta)]$. These two terms need only be computed once per light source and thus are preferably calculated via the geometry subsystem 302 or the processor 204. Then in operation 606, a $-\log_2(S\cdot-L)$ value, which represents a log-cosine of the spotlight angle between vectors S and −L, is computed for each pixel in the primitive.

Next in operation 608, it is determined whether the pixel is in a spotlight region or in other regions in log-cosine space. More specifically, it is determined in operation 608 whether the computed value of $-\log_2(S\cdot-L)$ is less than the spot_delta value. If so, the pixel is in the light region 406 and the method proceeds to operations 610, 614, and 616 to evaluate a spotlight value for the pixel. In operation 610, a value of $[-\log_2(S\cdot-L)*exp]$ is computed and is assigned to a variable X. Then in operation 614, a spotlight value Y for the pixel is evaluated by computing $Y=2^{-X}=(S\cdot-L)^{exp}$. The spotlight value Y is then clamped to zero if Y is less than zero in operation 616. A method and device for determining a spotlight value $(S\cdot-L)^{exp}$ is described in more detail in co-pending U.S. patent application Ser. No. 09/265,507, entitled "Method and Device for Generating Per-Pixel Values," by David Tannenbaum et al. The computed spotlight value is then output as the spotlight value for the pixel in operation 622.

On the other hand, in operation 608, if the value of $-\log_2(S\cdot-L)$ is not less than the spot_delta value, the pixel is in either cutoff region 410 or attenuation region 408. In this case, the method proceeds to operation 612 to determine whether the pixel is in the attenuation region 408 or in the cutoff region 410. Specifically, in operation 612, it is determined whether the value of $-\log_2(S\cdot-L)$ is less than the value of $\cos(\phi)$. If yes, the pixel is in the cutoff region 410 and the method proceeds to operation 620, where the spotlight value of the pixel is assigned a value of zero. Otherwise, the pixel lies in the attenuation region 408 and the method proceeds to operation 618 to compute an attenuated spotlight value by computing the product: atten*[cos (φ)−(S·−L)]. In either case, the computed spotlight value is output as the spotlight value at the pixel in operation 622. The method then terminates in operation 624.

In the method illustrated in FIG. 6, the comparison in operation 608 is performed in the log-cosine space, preferably in base-two log-cosine space. The conversion into log-cosine space facilitates the comparison operation in determining in which region a pixel belongs without requiring an arccosine operation. As set forth above, the conventional method often computes the angle θ by computing arccos(S·−L). Arccosine operations are generally expensive and time consuming to implement, however; thus the use of log-cosine space in the present invention results in substantial savings in terms of cost and processing time.

Figure 7:
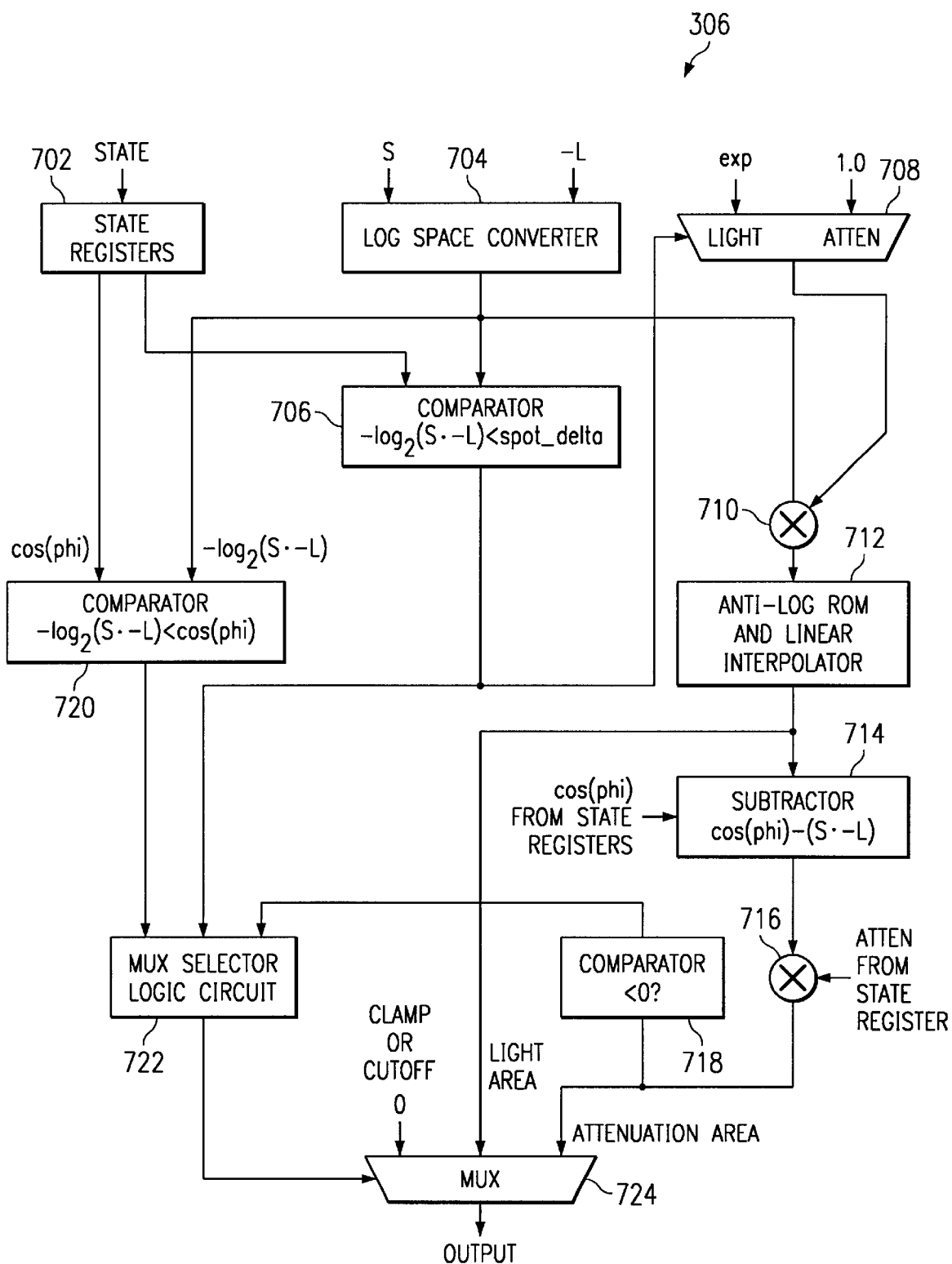
FIG. 7 illustrates a detailed block diagram of a lighting subsystem implementing the method of FIG. 5 in accordance with one embodiment of the present invention.

FIG. 7 illustrates a lighting subsystem 306 implementing the method of FIG. 5 in accordance with one embodiment of the present invention. In the lighting subsystem 306, state registers 702 are used to receive and store a plurality of values defining the regions of a light source. A log space converter 704 receives component values of S and −L vectors and determines the base two log of the dot product of (S·−L). A comparator 706 receives the spot_delta value and the base two log of the dot product of (S·−L) to determine whether the current pixel is in a lighted area. A multiplexer 708 is responsive to the comparison made by the comparator 706 and provides the spotlight exponent. When the pixel is in the attenuation region, the spotlight exponent is forced to unity (i.e., one).

A multiplier 710 receives the base two log of the dot product of (S·−L) and the spotlight exponent from the multiplexer 708. An anti-log ROM and linear interpolator 712 receives the product from the multiplier 710 and converts the product into the original number space. The output of the anti-log ROM and linear interpolator 712 is provided to a subtractor 714 and a multiplexer 724.

The subtractor 714 also receives a state, cosφ, and determines the difference cosφ−(S·−L), which essentially represents the distance into the attenuation region. A multiplier 716 receives the difference from the subtractor 714 and Atten from the state register 702 to produce a product, which is the final attenuated value of the pixel. A comparator 718 receives the attenuated value from the multiplier 716 and determines whether the attenuated value is less than zero, the result of which is then fed into a multiplexer selector logic circuit 722.

A comparator 720 receives the base two log of the dot product (S·−L) and the state, cosφ. The comparator 720 determines whether the pixel is in the cutoff region. The output of the comparator 720 is then fed to the multiplexer selector logic circuit 722, which generates a control signal to select the region determined for the pixel. The multiplexer 724 is responsive to the control signal and provides the final output.

The present invention thus provides an efficient method and device that can associate a pixel with one of a plurality of regions on a surface. A prime use of this is in generating spotlight effects without substantial aliasing. In particular, the conversion into and comparison in cosine space saves an arccosine step without necessitating a table lookup and interpolation process. Furthermore, the conversion into the log space enables the complex calculations needed for vector normalization to be carried out using only simple arithmetic operations, which can be efficiently implemented in hardware. For example, the use of log space allows simple arithmetic operations such as multiplication, addition, and subtraction to be substituted for more costly operations such as exponentiation, multiplication, and division, respectively. Thus, the present invention advantageously reduces the cost of implementing a computer graphics system in hardware.

The invention has been described herein in terms of several preferred embodiments. Other embodiments and equivalents of the invention will be apparent to those skilled in the art from consideration of the specification and practice of the invention. The embodiments and preferred features described above should be considered exemplary, with the invention being defined by the appended claims.

What is claimed is:

1. In a computer graphics system, a method for associating a pixel on a surface with one of a plurality of concentric regions defined on the surface, with a cutoff angle φ and a transition angle Δ defining the plurality of concentric regions on the surface, the concentric regions having a center point that is aligned with a source point disposed above the center point wherein the source point and the center point form a first axis, the source point and the pixel defining a second axis therebetween, the method comprising the operations of:

determining a difference angle (φ−Δ);

converting the difference angle into cosine space by determining cos(φ−Δ);

converting the difference angle in the cosine space into a log space;

evaluating a pixel angle θ between the first axis and the second axis in the log and cosine spaces; and determining in which region the pixel belongs by comparing the difference angle and the pixel angle in one or both of the log space and the cosine space.

2. The method as recited in claim 1, further comprising the operation of:

determining a pixel value for the pixel in accordance with the determined region.

3. The method as recited in claim 2, wherein the difference angle in the cosine space is converted into the log space by determining −log[cos(φ−Δ)].

4. The method as recited in claim 3, wherein the angles φ and Δ define an inner region, a transition region, and an outer region, wherein the cutoff angle φ defines an angle formed between the first axis and a third axis that is defined by the source point and an outer boundary between the transition and the outer region, and wherein the angle Δ defines an angle between the third axis and a fourth axis that is defined by the source point and an inner boundary between the inner region and the transition region.

5. The method as recited in claim 4, wherein the operation of determining in which region the pixel belongs further comprises the operations of:

determining if the pixel angle is less than the difference angle in the log and cosine spaces; and if the pixel angle is not less than the difference angle in the log and cosine spaces, determining, in the cosine space, if the pixel angle is less than cos(φ).

6. The method as recited in claim 5, wherein if the pixel angle is less than the difference angle, the pixel belongs in the inner region, if the pixel angle is not less than the difference angle and if the pixel angle is less than cos(φ), the pixel is belongs in the outer region, and if the pixel angle is not less than the difference angle and if the pixel angle is not less than cos(φ), the pixel belongs in the transition region.

7. The method as recited in claim 6, wherein the pixel value is a spotlight value, wherein a spotlight source is located at the source point and the spotlight value is defined by a spotlight source direction vector S, a spotlight vector L, and a spotlight exponent exp, the spotlight source direction vector S having a direction along the first axis and the spotlight vector L having a direction from the pixel to the spotlight source, wherein the spotlight on the surface defines the inner region, the transition region, and the outer region.

8. The method as recited in claim 7, wherein the pixel angle is evaluated by computing (S·-L).

9. The method as recited in claim 1, wherein the log space is a negative log space.

10. The method as recited in claim 8, wherein the operation of determining the pixel value for the pixel further comprises the operations of:

if the pixel is determined to be located in the inner region, computing the spotlight value for the pixel in accordance with a spotlight equation that includes a term $(S\cdot-L)^{exp}$;

if the pixel is determined to be located in the transition region, determining the spotlight value for the pixel by computing an attenuated spotlight value; and if the pixel is determined to be located in the outer region, assigning a predetermined spotlight value to the pixel.

11. The method as recited in claim 10, wherein the operation of computing the spotlight value for the pixel in the transition region further comprises the operations of:

evaluating an attenuation coefficient by computing $\cos^{exp}(\phi-\Delta)/[\cos(\phi)-\cos(\Delta)]$; and multiplying the spotlight value by the attenuation coefficient to generate the attenuated spotlight value at the pixel.

12. The method as recited in claim 10, wherein the predetermined spotlight value is zero.

13. The method as recited in claim 1, wherein the log space is a base-two log space.

14. The method as recited in claim 1, wherein a plurality of regions is defined by a plurality of angles.

15. A device for associating a pixel on a surface with one of a plurality of concentric regions defined on the surface, with a cutoff angle $\phi$ and a transition angle $\Delta$ defining the plurality of concentric regions on the surface, the concentric regions having a center point that is aligned with a source point disposed above the center point wherein the source point and the center point form a first axis, the source point and the pixel defining a second axis therebetween, the device comprising:

means for determining a difference angle $(\phi-\Delta)$;

means for converting the difference angle into cosine space by determining $\cos(\phi-\Delta)$;

means for converting the difference angle in the cosine space into a log space;

means for evaluating a pixel angle $\theta$ between the first axis and the second axis in the log and cosine spaces; and means for determining in which region the pixel belongs by comparing the difference angle and the pixel angle in one or both of the log space and the cosine space.

16. The device as recited in claim 15, wherein the difference angle in the cosine space is converted into the log space by determining $-\log[\cos(\phi-\Delta)]$.

17. The device as recited in claim 15, wherein the angles $\phi$ and $\Delta$ define an inner region, a transition region, and an outer region, wherein the cutoff angle $\phi$ defines an angle formed between the first axis and a third axis that is defined by the source point and an outer boundary between the transition and the outer region, and wherein the angle $\Delta$ defines an angle between the third axis and a fourth axis that is defined by the source point and an inner boundary between the inner region and the transition region.

18. The device as recited in claim 15, wherein the region in which the pixel belongs is determined by:

determining, in the log and cosine spaces, if the pixel angle is less than the difference angle; and if the pixel angle is not less than the difference angle in the log and cosine spaces, determining, in the cosine space, if the pixel angle is less than $\cos(\phi)$.

19. The device as recited in claim 18, wherein if the pixel angle is less than the difference angle, the pixel belongs in the inner region, if the pixel angle is not less than the difference angle and if the pixel angle is less than $\cos(\phi)$, the pixel is belongs in the outer region, and if the pixel angle is not less than the difference angle and if the pixel angle is not less than $\cos(\phi)$, the pixel belongs in the transition region.

20. The device as recited in claim 19, wherein a spotlight source is located at the source point and a spotlight value is defined by a spotlight source direction vector S, a spotlight vector L, and a spotlight exponent exp, the spotlight source direction vector S having a direction along the first axis and the spotlight vector L having a direction from the pixel to the spotlight source, wherein the spotlight on the surface defines the inner region, the transition region, and the outer region.

21. The device as recited in claim 20, wherein the pixel angle is evaluated by computing (S·-L).

22. The device as recited in claim 21, wherein, if the pixel is determined to be located in the inner region, the spotlight value is computed for the pixel in accordance with a spotlight equation that includes a term $(S\cdot-L)^{exp}$;

if the pixel is determined to be located in the transition region, the spotlight value for the pixel is computed by interpolating the spotlight value between the inner and outer regions; and if the pixel is determined to be located in the outer region, a predetermined spotlight value is assigned to the pixel.

23. The method as recited in claim 15, wherein a plurality of regions is defined by a plurality of angles.

* * * * *